(12) United States Patent
Palin et al.

(10) Patent No.: US 7,085,532 B2
(45) Date of Patent: Aug. 1, 2006

(54) ACCELERATING A SET-UP PROCEDURE FOR WIRELESS CONNECTIONS BETWEEN DEVICES

(75) Inventors: Arto Palin, Lempaala (FI); Antti Lappetelainen, Espoo (FI)

(73) Assignee: Nokia Corporation, Espoo (FI)

( * ) Notice: Subject to any disclaimer, the term of this patent is extended or adjusted under 35 U.S.C. 154(b) by 729 days.

(21) Appl. No.: 10/032,744

(22) Filed: Oct. 26, 2001

(65) Prior Publication Data

US 2003/0083015 A1 May 1, 2003

(51) Int. Cl.
*H04B 7/00* (2006.01)

(52) U.S. Cl. ..................... 455/41.2; 455/515

(58) Field of Classification Search ...... 455/41.1–41.3, 455/502, 515; 375/354–359, 368; 370/350, 370/503
See application file for complete search history.

(56) References Cited

U.S. PATENT DOCUMENTS 6,269,395 B1 * 7/2001 Blatherwick et al. ....... 709/219
6,400,695 B1 * 6/2002 Chuah et al. ............... 370/310
6,564,068 B1 * 5/2003 Marsan ...................... 455/525

OTHER PUBLICATIONS

"Specification of the Bluetooth System", Ver. 1.1 (relevant pages thereof).

* cited by examiner

*Primary Examiner*—Curtis Kuntz
*Assistant Examiner*—Alexander Jamal
(74) *Attorney, Agent, or Firm*—Perman & Green, LLP

(57) ABSTRACT

The invention relates to a method for accelerating a set-up procedure for wireless connections between at least two devices. The set-up procedure requires a first device to receive an inquiry message initiating said procedure from a second device twice with a back-off time in between before responding to the second device. In order to enable such an acceleration, it is proposed that the first device scans for inquiry messages and measures a value of a parameter associated to a detected inquiry message indicative of the received power level of the inquiry message. Then, the first device determines at least a maximum number as a function of the measured value, or of a pathloss determined based on this measured value. It moreover generates a random number within a number space limited by the maximum number. Finally, the first device scans again for the inquiry message after a back-off time. The length of the back-off time is related to said generated random number.

20 Claims, 4 Drawing Sheets

| RSSI | Used min RAND | Used max RAND |
|---|---|---|
| >=-40dBm | 0 | 31 |
| -40 - -60dBm | 67 | 127 |
| default | 163 | 255 |

| RSSI | Used max RAND |
|---|---|
| >=-40dBm | 63 |
| -40 - -60dBm | 255 |
| default | 511 |

FIG. 2

| RSSI | Used min RAND | Used max RAND |
|---|---|---|
| >=-40dBm | 0 | 31 |
| -40 - -60dBm | 67 | 127 |
| default | 163 | 255 |

FIG. 3

| Used max RAND | Mean time for first FHS | Max time for first FHS | Max time for first FHS if one collision in second ID reception |
|---|---|---|---|
| 1024 | (512x625µs + 10ms + 10ms) = 0.34s | (1024x625µs + 20ms + 20ms) = 0.68s | (1024x625µs + 20ms + 20ms + 1024x625ms + 20ms + 20ms ) = 1.36s |
| 512 | (256x625µs + 10ms + 10ms) = 0.18s | (512x625µs + 20ms + 20ms) = 0.36s | (512x625µs + 20ms + 20ms + 512x625ms + 20ms + 20ms) = 0.72s |
| 256 | (128x625µs + 10ms + 10ms) = 0.1s | (256x625µs + 20ms + 20ms) = 0.2s | (256x625µs + 20ms + 20ms + 256x625ms + 20ms + 20ms) = 0.4s |
| 64 | (32x625µs + 10ms + 10ms) = 0.04s | (64x625µs + 20ms + 20ms) = 0.08s | (64x625µs + 20ms + 20ms + 64x625ms + 20ms + 20ms) = 0.16s |

FIG. 4

ACCELERATING A SET-UP PROCEDURE FOR WIRELESS CONNECTIONS BETWEEN DEVICES

FIELD OF THE INVENTION

The invention relates to a method for accelerating a set-up procedure for wireless connections between at least two devices, which set-up procedure requires a first device to receive an inquiry message initiating said procedure from a second device twice with a back-off period in between before responding to said second device. The invention relates equally to such devices and to a communications system with such devices.

BACKGROUND OF THE INVENTION

Wireless connections between different devices have been specified for example in the global "Specification of the Bluetooth system", v,1.1, Feb. 22, 2001, which is incorporated by reference herein.

The Bluetooth™ specification contains information required to ensure that diverse electronic devices supporting the Bluetooth™ wireless technology can communicate with each other worldwide via short-range radio links. The specification is aimed at providing a standard for low complexity low-cost wireless connections between portable and/or fixed devices, in particular devices which are located within a range of 10 meters to each other. An example for the employment of such a Bluetooth™ short-range radio link is a wireless connection between a laptop and a printer, or between a mobile phone and a cashier for financial transactions.

In some situations a device may want to establish a connection with another device of which it does not know the address, or it may want to determine all devices within its range to which a connection would be possible.

To this end, the specification presents inquiry procedures. In these procedures, a first device that wishes to establish a connection to some other device periodically transmits an inquiry message as broadcast message. The inquiry message has the form of an identity (ID) packet and might also include an indication of the type of devices that are to respond. In case all Bluetooth™ devices in the range of the first device are to be inquired for, a general inquiry access code (GIAC) is included in the inquiry message. In case only Bluetooth™ devices of a specific kind are to be inquired for, one of a number of dedicated inquiry access codes (DIAC) is included in the inquiry message.

All devices that are willing to establish upon an inquiry a connection to some other device, perform a scanning for such inquiry messages in an inquiry scan substate. The length of a scan period in which such a scanning is performed is denoted $T_{w\_inquiry\_scan}$ and should lie in a range of 11.25 ms to 2.56 s. The scan interval between two consecutive scans is denoted $T_{inquiry\_scan}$ and has a maximum value of 2.56 s. Alternatively, a continuous scanning could be carried out.

When a scanning device detects an inquiry message for which it was scanning, it will respond with a response message, more specifically with a Frequency Hop Synchronization (FHS) packet, carrying parameters of the device. These parameters comprise e.g. the address of the scanning device. However, in order to avoid a conflict when several devices are responding to an inquiry message at the same time, a further protocol is employed, before a response message is allowed to be transmitted. A similar problem may occur with colliding inquiring messages at a scanning device, when several devices are inquiring at the same time for other device to which they might establish a connection. According to this protocol, when a device detects an inquiry message, it generates a random number RAND between 0 and 1023. The device will then go back to sleep or to some other preceding state for the duration of a number of slots corresponding to the generated random number RAND. The duration of such a back-off is thus 0–0.64 s. After the at least RAND time slots, the device will return to the inquiry scan substate and scan again for the same inquiry message detected before. Only when such a further inquiry message is received, the device turns into an inquiry response substate and transmits an FHS packet to the inquiring device, before returning again to the inquiry scan substate.

In between the transmissions of the inquiry message, the inquiring device scans for inquiry response messages. With the information in the received response messages it is then able to establish a connection to the responding device.

A problem with the specified approach for a connection set-up procedure in Bluetooth™ is the long set-up time in the inquiry process, resulting from the mentioned back-off of the scanning devices between the scanning for two inquiry messages. With the currently defined method, the maximum RAND time resulting in a back-off of 1023 time slots is taking at least 25%, and if continuous scanning is considered even 5600%, of the total inquiry time. If a very fast inquiry is desired and therefore the inquiring device or the scanning device are operating all the time, the back-off accounts e.g. for 0.32 s, while 30 ms is the fastest time that could be realized with the inquiry procedure without a back-off. This illustrates also the great impact of the back-off on the absolute inquiry time.

An additional problem with the set-up time arises when two or more devices receive the ID packet. Then it is possible that during the inquiry process the inquiring device receives multiple FSH packets and begins the paging process, which is used for establishing a connection with a specific device, first with a 'wrong' device. The 'right' pair of devices can never be known for sure beforehand. Considering m—(mobile) commerce with Bluetooth™, it is likely that devices closest to each other form the 'right' pair of devices.

In order to reduce the overall time during the set-up of a connection, it has been proposed to reduce the average back-off time during the inquiry procedure by reducing the allowed maximum number for the to be generated RAND to a lower value, e.g. to 256 instead of the current allowed maximum number of 1023. However, a reduction of the maximum number for the RAND increases the probability of collisions. Hence the benefit of reducing the maximum number for the RAND is partly eliminated, because several inquiry rounds may become necessary before a response is received successfully at the inquiring device.

SUMMARY OF THE INVENTION

It is an object of the invention to enable an accelerated set-up procedure for wireless connections between at least two devices. More specifically, it is an object of the invention to reduces the time required for an inquiry procedure between two or more devices that wish to establish a wireless connection.

To reach the objects of the invention, a method for accelerating a set-up procedure for wireless connections between at least two devices, which set-up procedure requires a first device to receive an inquiry message initiating the procedure from a second device twice with a back-off time in between before responding to the second device, is proposed. The proposed method comprises for the first device as a first step scanning for inquiry messages. The scanning can be performed in scanning intervals of a predetermined length with predetermined distances to each other. The scanning can also be performed continuously. In a second step, a value of a parameter of a detected inquiry message is measured, which value is indicative of the received power level of the detected inquiry message. Then, at least a maximum number is determined as a function of the measured value indicative of the received power level. This maximum number substitutes in the known method the fixed maximum number of 1023 for the RAND that is to be generated. Next, a random number is generated within a number space limited by the determined maximum number. Finally, the first device performs further scanning for the inquiry message for which a random number was generated after a back-off time the length of which is related to the generated random number. The back-off time can correspond in particular to the generated random number of time slots. If a second inquiry message by the same second device is detected in this further scanning, the first device can transmit an inquiry response.

On the other hand, the objects are reached with a device and a communications system comprising means for carrying out the steps proposed in for the method according to the invention.

The invention proceeds from the idea that if the maximum allowed RAND is reduced in an adaptive way instead of to a generally applicable fixed value, the average time required for establishing a connection can be decreased, while avoiding at the same time an increase in collisions between simultaneous responses or an increase in collisions during a scanning for respective second inquiry messages. Such an adaptive reduction of the maximum RAND is achieved according to the invention by defining the maximum number for the RAND for each detected inquiry message as a function of the received power level at the scanning device.

Instead of determining only a maximum number, it is also possible to determine a number space defined by a minimum number and maximum number according to a received power level. The random number that is to be generated then has to lie within the determined number space. If the possible number spaces are not overlapping, this option allows to prevent inquiry responses from units with sufficiently different RSSI from overlapping. Depending on the number of RAND spaces defined, such number spaces can also make it very likely that when e.g. continuous scanning is utilized, a unit that is closest or has the best link will response first. This is very useful when, for example, an applicable access point (AP) is looked for. In this cases the AP that has the best link quality is found first. When an AP responded, the inquiry can be cancelled. Alternatively, the AP that responded first could be displayed for example at the top of a list of available APs on the screen of a mobile terminal. Otherwise it could take 10 s or even more to find an appropriate AP.

The receiving power level is a good estimate of the relative distance between an inquiring device and a scanning device at a given environment. The maximum number for the RAND can thus be assigned with the invention according to the distance between devices involved in the initialization of a set-up in a desired way. Since the maximum number for the RAND is not reduced in general to a particularly low value for all distances, a diversity of resulting back-off times is maintained so that collisions can usually be avoided.

The maximum number for the RAND can depend only on the value indicative of the received power level as variable parameter. In particular, the maximum number for the RAND can be determined as function of an RSSI as measured value indicative of the received power, which RSSI can be determined in any known way.

Alternatively, the maximum number can depend in addition on other variable parameters. If an indication of the transmission power level employed by the inquiring device for transmitting the inquiry message is included in the message, the maximum number for the RAND can depend for instance on the pathloss of the signal. The pathloss can be determined based on the indication of the transmission power level and on the measured value indicative of the received power level. If an indication of the transmission power is available, it is preferred that the pathloss is used instead of the RSSI for determining a maximum number for the RAND.

In a preferred embodiment of the invention, the assigned maximum number for the RAND is the higher, the lower the RSSI is, or the higher the pathloss is, respectively. Correspondingly, an assigned number space is preferably the higher, the lower the RSSI is, or the higher the pathloss is, respectively. It is an advantage of this embodiment that it enables a faster inquiry process for a scanning device closest to the inquiring device or for an inquiry device closest to a scanning device. At the same time, the collision probability is not increased significantly, since a higher maximum number for the RAND is still assigned to inquiring devices farther away from the scanning device or from which the scanning device is farther away. Since the time required for the set-up process for a connection between devices that are closest to each other is decreased, it presents for example an attractive alternative for financial transactions with Bluetooth™ on a short range of about 1 meter.

If the scanning device lacks measurement capabilities, it should use the highest possible maximum number for the RAND, in particular 1023. Thus, a communications system according to the invention allows that extra complexity is only added to those devices for which a faster set up procedure is desirable, in particular for often performing devices, e.g. financial transactions.

The use of the invention is to be seen in particular, though not exclusively, with Bluetooth™ devices and Bluetooth™ communications systems.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE FIGURES

FIG. 2 presents an exemplary table associating measured RSSI values to maximum RAND values;

FIG. 3 presents an exemplary table associating measured RSSI values to RAND number spaces; and FIG. 4 is a table presenting mean and maximum inquiry times resulting with different maximum RAND values.

DETAILED DESCRIPTION OF THE INVENTION

Figure 1:
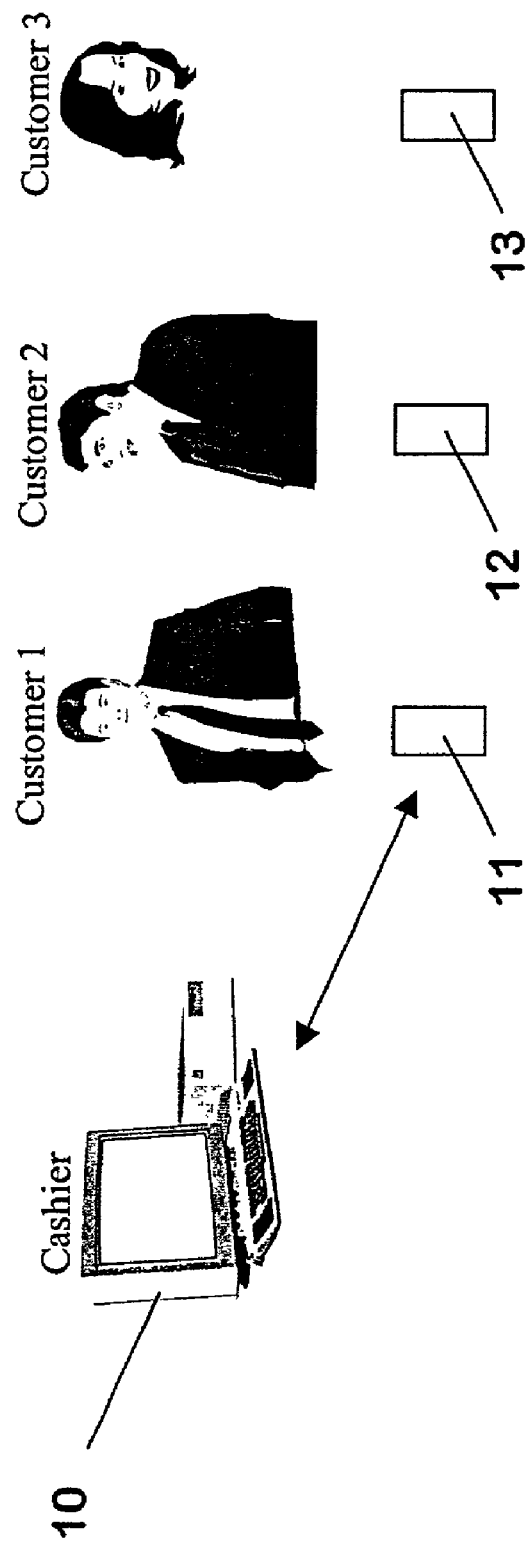
FIG. 1 presents an exemplary situation in which the invention may be employed.

FIG. 1 presents a shop as an environment in which an embodiment of the communications system of the invention may be employed. It should be understood that FIG. 1 is not drawn to scale and that it is merely intended to conceptually illustrate the structures and procedures described herein.

In the shop of FIG. 1, a cashier 10 positioned for instance on a desk is used as Short Range Financial Transfer (SRFT) application for a Bluetooth™ system. Several customers 1–3 provided with some electronic payment device 11–13, e.g. a mobile phone, are close to the cashier 10 for paying some merchandize. Each payment device 11–13 is depicted as rectangle below the customer 1–3 to whom it belongs. Of the three customers, customer 1 is located closest to the cashier 10, customer 3 is located farthest away from the cashier 10, and customer 2 is located somewhere between customer 1 and customer 3. The cashier 10 and the electronic payment devices 11–13 of the three customers 1–3 are all designed as Bluetooth™ devices.

In order to realize the desired financial transfer, a connection has to be established between the cashier 10 and the device 11–13 of the respective customer 1–3. There are two basic alternatives for setting up such a connections. In a first alternative, the customers 1–3 send out inquiry messages to which the cashier 10 has to respond. In a second alternative, the cashier 10 sends out inquiry messages to which the devices 11–13 of the customers 1–3 may respond.

In the first alternative, if the first customer 1 desires to pay, he initiates an inquiry in close proximity of the cashier 10 by pressing a button of his payment device 11 or by some corresponding action. As a result, an inquiry message by the payment device 11 is transmitted as broadcast message. A Bluetooth™ unit in the cashier 10 performs a continuous scanning for inquiry messages and is thus able to detect each inquiry message transmitted by a close enough inquiring device. When the cashier 10 detects the inquiry message from customer 1, it measures the RSSI for this inquiry message and provides a corresponding reading to some processing means of its Bluetooth™ unit. Since the first customer 1 is standing just in front of a desk with the cashier 10, the inquiry message has a radio signal strength of 0 dBm, which means that the reading is around −40 dBm.

Basically at the same time as customer 1, also customers 2 and 3 initiate an inquiry with their respective payment device 12, 13. The cashier 10 thus detects within a very short interval, for example within 1 s, in addition to the inquiry message from device 11 an inquiry message from devices 12 and 13. The cashier 10 also measures an RSSI for the detected inquiry message of customer 2, which is in the presented situation e.g. about −60 dBm, and an RSSI for the inquiry messages of customer 3, which is in the presented situation e.g. about −65 dBm. The cashier 10 provides corresponding readings to the processing means of its Bluetooth™ unit.

Based on the respectively measured RSSI values, in a first option, a maximum RAND is roughly selected by the processing means for each of the inquiry messages in a way that the higher the RSSI the smaller the maximum RAND.

Due to the high RSSI value of the first customer 1, the processing means of the cashier 10 select in this first option the smallest allowed maximum RAND of e.g. 64 for the first customer 1. Based on the RSSI value of −60 dBm for customer 2, this customer is assigned a maximum RAND of e.g. 256. Based on the RSSI value of −65 dBm for customer 3, this customer is assigned a maximum RAND of e.g. 512.

In a second option, the processing means roughly select a RAND number space instead of only a maximum RAND for each of the inquiry messages in a way that the higher the RSSI, the narrower and lower the number space.

Due to the high RSSI value of the first customer 1, the processing means of the cashier 10 select in this second option the smallest allowed maximum RAND of e.g. 31 for the first customer 1. This maximum RAND defines a number space between e.g. 0 and 31. Based on the RSSI value of −60 dBm for customer 2, this customer is assigned a maximum RAND of e.g. 127, which RAND defines a number space between e.g. 67 and 127. Based on the RSSI value of −65 dBm for customer 3, this customer is assigned a maximum RAND of e.g. 255, which RAND defines a number space between e.g. 163 and 255.

The gap between for example the maximum RAND for customer 1 and the minimum RAND for customer 2 is provided to reduce the collision probability.

For each customer 1–3, the cashier 10 then generates a RAND within the limits provided by the respective determined maximum RAND. Thereupon, the cashier 10 waits for a back-off period of RAND time slots with the generated RAND for each customer 1–3. After the back-off period for the respective customer 1–3, the cashier scans again for an inquiry message by the device 11–13 of this customer 1–3. After detection of such a second inquiry message from the same device 11–13, the cashier 10 transmits a FHS packet as inquiry response message, in order to enable the device 11–13 of this customer 1–3 to set up the actual connection for the financial transfer. The transmission of inquiry message and inquiry response and a subsequently established connection are indicated for payment device 11 by a double-headed arrow.

Customer 1 is served on an average in the fastest way possible, since the lowest maximum RAND was assigned to his device 11, resulting on an average in the shortest back-off time. Also if a collision occurs with the second inquiry message from one of the other customers 2, 3, customer 1 is always in the best possible situation because of best link conditions. If a second round of the inquiry procedure is needed, the device 11 of customer 1 can again perform it on an average faster than the devices 12, 13 of the other customers 2, 3, because device 11 is assigned again the lowest maximum RAND.

The presented selection principle has the advantage that the device that has the most reliable link conditions will receive the fastest inquiry response. Since the reliability of the link conditions correlates with the distance between an inquiring and a scanning device, this means that usually, the device that is closest to the cashier is the one which is connected most quickly. The device which is closest to the cashier has the highest probability of a successful inquiry response, since the other inquiring devices are farther away, and hence the closest device will block their messages. At the same time, the probability that the scanning device responses are consecutive is high since the maximum RAND is selected according to the distances. This would not be the case if the same low RAND was assigned to all devices. The proposed embodiment of the invention allows for a very low number as maximum RAND, since in the presented situation the scanning device will usually be at a close distance to a single inquiring devices, while no other inquiry device is located at such a close distance.

In the mentioned second alternative, in which the cashier 10 transmits inquiry messages and the payment devices 11–13 scan for such inquiry messages, the situation is quite similar to the first alternative, and the same principle of assigning maximum RAND values can be employed with corresponding advantages.

However, because a cashier 10 is normally powered, it may use even a higher power level than 0 dBm for transmitting an inquiry message, e.g. a radio power level of 20 dBm. This makes it difficult for a scanning device 11–13 to decide whether the cashier 10 is right next to it or farther away. Therefore, it is proposed for the second alternative that the cashier 10 reports the transmission power TxP together with the inquiry message. To this end, the inquiry message may be extended by a data field which contains information about the transmission power used by the cashier 10. Thus, the scanning devices 11–13 can read the transmission power from the inquiry message, measure the power level of the received inquiry message, and assign a maximum RAND according to the pathloss on the transmission path, i.e. the difference between the transmission power level and the received power level. The pathloss is in such a situation a relatively good indication of the distance between the inquiring device 10 and the respective scanning device 11–13.

The maximum RAND values or the RAND number spaces can be selected in both alternatives for example from a table assigning RAND values to RSSI or pathloss values.

FIG. 2 depicts such a table which assigns maximum RAND values in a second column to specific RSSI values in a first column. More specifically, RSSI values of down to −40 dBm are mapped to a maximum RAND of 64, RSSI values between −40 dBm and −60 dBm respectively are mapped to a maximum RAND of 256, and by default, which includes all other possible RSSI values, a maximum RAND of 512 is assigned. It was assumed for this table that the transmitter power is 0 dBm, thus the same ranges could be used for mapping pathloss values instead of RSSI values to maximum RAND values. Only in this case, the values in the first column would have positive signs and be values in dB instead of dBm.

FIG. 3 depicts a similar table which assigns number spaces defined by minimum RAND values in a second column and maximum RAND values in a third column to specific RSSI values in a first column. More specifically, RSSI values of down to −40 dBm are mapped to a number space between a minimum RAND of 0 and a maximum RAND of 31, RSSI values between −40 dBm and −60 dBm are mapped to a number space between a minimum RAND of 67 and a maximum RAND of 127, and by default, which includes all other possible RSSI values, a number space between a minimum RAND of 163 and a maximum RAND of 255 is assigned. A good gap size between the number spaces is 36, since in the worst case, an undesired device receives an ID packet 22.5 ms before the desired device, where 22.5 ms is a default scan window of an enhanced Bluetooth™ scanner, and where 22.5 ms are equal to 36 time slots. If the gap size is 36 or higher, the device having a lower number space for its back-off time will transmit its FHS packet before a device to which a higher number space was assigned. The underlying condition is that the desired device is continuously scanning for inquiry messages. It should be noted that there can be more RAND number spaces than in table 3, e.g. one number space for every 10 dBm starting from −40 dBm, which would be beneficial e.g. in an AP scenario. Similar as with table 2, an equivalent table could be used for mapping pathloss values to number spaces.

In other embodiments of the invention, other mappings of RSSI or pathloss values to maximum RAND values or number spaces can be defined. The smallest allowed maximum RAND value could even be set to 0.

FIG. 4 finally presents some exemplary calculations for inquiry times resulting with different maximum RAND values for the case that the scanner of a scanning device is always switched on. The inquiry times are calculated such that they represent the interval from the point of time when a device starts an inquiry to the point of time at which a first FHS packet is received successfully.

A first column of the table in FIG. 4 shows four different used maximum RAND values 64, 256, 512 and 1024. The second column shows for these four maximum RAND values a mean inquiry time for receiving the first FHS. The third column shows for the four used maximum RAND values the maximum inquiry time for receiving the first FHS. The second and the third columns relate to an error free situation. The last column shows for the four maximum RAND values the maximum inquiry time for receiving the first FHS for the case there was a collision when receiving a second ID packet as second inquiry message. Each inquiry time in the table is calculated as the sum of the respective mean or maximum back-off and the mean or maximum time of the transmission of the first inquiry message and the inquiry response. The mean or maximum back-off time is the respective mean or maximum RAND times the time of one time slot, 625 µs. The mean and the maximum time required for the transmissions was assumed to be 10 ms and 20 ms respectively.

It can be seen in the table that even in the worst case for an inquiring device to which a maximum RAND of 64 was assigned, i.e. in the case of a required second inquiry, the maximum inquiry time of 0.16 s is still by far shorter than the mean time of 0.34 s required for a single inquiry process with the maximum RAND of 1024 currently used for all inquiring devices.

While there have shown and described and pointed out fundamental novel features of the invention as applied to a preferred embodiment thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for accelerating a set-up procedure for wireless connections between at least two devices, which set-up procedure requires a first device to receive an inquiry message initiating said procedure from a second device twice with a back-off time in between before responding to said second device, said method comprising for said first device:

scanning for inquiry messages;
measuring a value of a parameter associated to a detected inquiry message indicative of the received power level of said detected inquiry message;
determining at least a maximum number as a function of said measured value;

generating a random number within a number space limited by said determined maximum number; and scanning again for said detected inquiry message after a back-off time, the length of said back-off time is related to said generated random number.

2. The method of claim 1, wherein determining said maximum number as a function of said measured value comprises determining said number space defined by a maximum number and a minimum number as a function of said measured value.

3. The method of claim 1, wherein said maximum number is determined for said detected inquiry message as a function of a received signal strength indicator (RSSI), said RSSI is measured as value of a parameter indicative of said received power level of said detected inquiry message.

4. The method of claim 3, wherein the lower said measured RSSI of a detected inquiry message is, the higher said maximum number is set.

5. The method of claim 3, wherein the same maximum number is assigned to each RSSI belonging to a group defined by a predetermined range of RSSI values.

6. The method of claim 3, wherein determining said maximum number for a detected inquiry message as a function of a received signal strength indicator (RSSI) comprises determining said number space defined by a maximum number and a minimum number as a function of said RSSI, and wherein the lower said measured RSSI of a detected inquiry message is, the higher said number space is set.

7. The method of claim 3, wherein determining said maximum number for a detected inquiry message as a function of a received signal strength indicator (RSSI) comprises determining said number space defined by a maximum number and a minimum number as a function of said RSSI, and wherein the same number space is assigned to each RSSI belonging to a group defined by a predetermined range of RSSI values.

8. The method of claim 1, wherein said detected inquiry message comprises an indication of a transmission power level employed by said second device for transmitting said detected inquiry message, and wherein said maximum number is determined as a function of the pathloss of said detected inquiry message, said pathloss is calculated from said transmission power level and said measured value of a parameter indicative of said received power level of said detected inquiry message.

9. The method of claim 8, wherein the lower said received power level of said detected inquiry message is, the higher said maximum number is set.

10. The method of claim 8, wherein the same maximum number is assigned to each pathloss belonging to a group defined by a predetermined range of values for said pathloss.

11. The method of claim 8, wherein determining said maximum number as a function of said pathloss of said detected inquiry message comprises determining said number space defined by a maximum number and a minimum number as a function of said pathloss, and wherein the higher said measured path loss of a detected inquiry message is, the higher said number space is set.

12. The method of claim 8, wherein determining said maximum number as a function of said pathloss of said detected inquiry message comprises determining said number space defined by a maximum number and a minimum number as a function of said pathloss, and wherein the same number space is assigned to each pathloss belonging to a group defined by a predetermined range of values for said pathloss.

13. The method of claim 1, wherein to a user of said second device sending out inquiry messages, a list of first devices responding to said inquiry messages is presented, said list includes an indication of the order in which said first devices responded to said inquiry message by said second device.

14. A device suited for establishing a wireless connection to at least one other device comprising:

scanning means for scanning for inquiry messages transmitted by other devices via an air interface;

measuring means for measuring a value of a parameter associated to a detected inquiry message indicative of the received power level of said detected inquiry message; and processing means for determining at least a maximum number as a function of said measured value, for generating a random number within a number space limited by said determined maximum number, and for determining a back-off time of which the length corresponds to said generated random number, wherein said scanning means are only allowed to scan again for said detected inquiry message after said back-off time.

15. The device of claim 14, wherein determining at least a maximum number as a function of said measured value by said processing means comprises determining said number space defined by a maximum number and a minimum number as a function of said measured value.

16. The device of claim 14, wherein said device is a Bluetooth™ device.

17. A communications system comprising at least a first device with means for transmitting inquiry messages via an air interface for establishing a wireless connection with another device, and at least a second device with:

scanning means for scanning for inquiry messages transmitted by other devices via an air interface;

measuring means for measuring a value of a parameter associated to a detected inquiry message indicative of the received power level of said detected inquiry message; and processing means for determining at least a maximum number as a function of said measured value, for generating a random number within a number space limited by said determined maximum number, and for determining a back-off time of which the length corresponds to said generated random number, wherein said scanning means are only allowed to scan again for said detected inquiry message after said back-off time.

18. The communications system of claim 17, wherein determining at least a maximum number as a function of said measured value by said processing means of said at least second device comprises determining said number space defined by a maximum number and a minimum number as a function of said measured value.

19. The communications system of claim 17, wherein the processing means of devices of said communications system without capabilities for measuring received power levels employ a fixed maximum number limiting a number space within which a random number is generated in order to determine a corresponding back-off time.

20. The communications system of claim 17, wherein said communications system is a Bluetooth™ communications system.

* * * * *